Patented Oct. 23, 1934

1,978,135

UNITED STATES PATENT OFFICE 1,978,135

METHOD OF REFINING ROSIN

Irvin W. Humphrey, Wharton, N. J., assignor to Hercules Powder Company, Wilmington, Del., a corporation of Delaware No Drawing. Application April 3, 1931, Serial No. 528,710

26 Claims. (Cl. 87—2)

My invention relates to an improved method for effecting the refining of rosin. The method in accordance with my invention is more specifically applicable to the removal or separation of latent color bodies from rosin in which such color bodies are contained.

Latent color bodies are contained in rosin, and more especially in wood rosin, though they are sometimes found in low grades of gum rosin, in an invisible form and are objectionable due to their tendency to darken under certain conditions with consequent darkening of the rosin or product in which it is contained. Thus, latent color bodies will darken in the presence of air and an alkali and their presence in rosin renders the rosin unusable for the production of soaps and in varnishes, sizes, etc., where the maintenance of a light color in the product is required.

Now, in accordance with my invention, I provide a method whereby rosin, and more especially wood rosin, may be largely freed from latent color bodies, ordinary or visible color bodies being removed from the rosin at the same time.

The method embodying my invention, from the broad standpoint involves subjecting rosin to a refining treatment, as by distillation, or by treating with a selective solvent for color bodies, or both and then effecting crystallization of the rosin from a neutral organic water miscible solvent therefor.

In proceeding in accordance with my invention, distillation may be effected, with or without the injection of steam, at any suitable temperature, say within about the range 250° C.-300° C., and under a suitable pressure, say up to 1.5 inches of mercury, in order to avoid any substantial decomposition of the rosin. Treatment with a selective solvent for color bodies may be carried out with the use, for example, of furfural, etc., as fully described in United States Letters Patent No. 1,715,088, dated May 28, 1929, to Kaiser and Hancock, to which reference is made for the details of procedure.

Where the rosin is treated both by distillation and with a selective solvent for color bodies, the distillation may desirably follow treatment with a selective solvent, though it will be understood that the rosin may be first treated with a selective solvent and then distilled.

The neutral, organic, water miscible solvent from which the rosin is finally crystallized may, for example, be methanol, ethyl alcohol, isopropyl alcohol, acetone, etc. and the solvent may be used in a substantially anhydrous state or containing a substantial proportion of water.

The crystallization of the pretreated rosin from the solvent may be effected in various ways, for example, an excess of pretreated rosin may be dissolved in, for example, 95% ethyl alcohol by the aid of heat and a part crystallized on cooling, or 85% alcohol may be used in place of 95%. Further, pretreated rosin is dissolved in, for example, substantially anhydrous alcohol, say 99% ethyl alcohol, and rosin crystallized from the solution by the addition of water. The crystallized rosin may be desirably washed, for example, with alcohol.

The rosin, after distillation or extraction with a selective solvent, will be found to have a greater tendency to crystallize than prior to such treatment. Hence, the pretreatment of the rosin not only reduces the impurity content of the rosin, but renders it more susceptible to crystallization from the solvent, as substantially pure abietic acid.

As illustrative of the practical adaptation of my invention, ordinary wood rosin is distilled at say a temperature of about 275° C. and under a pressure of not over about 1 inch of mercury. About 1500 parts of the distilled rosin is then dissolved in about 500 parts of 99% ethyl alcohol with the aid of heat. The solution formed is then cooled and the crystallized rosin filtered out, given a wash with say about 400 parts of alcohol to remove adhering color bodies and heated under reduced pressure to remove residual alcohol.

The product will amount to about 560 parts of refined rosin grading X in color, having an acid number of 183 and a saponification number of 184. The rosin, as indicated by its acid number, is largely abietic acid and will yield, for example, a soap which will not discolor on aging, indicating the substantial absence of latent color bodies.

As a further illustration, for example, wood rosin is distilled under a vacuum and about 1000 parts of the distilled rosin are dissolved in about 200 parts of 95% ethyl alcohol with heating. Rosin is precipitated or crystallized on cooling the solution, filtered out, washed with 200 parts of alcohol to remove adhering color bodies and finally heated to drive off residual alcohol. The rosin product will amount to about 500 parts, grading N in color, having an acid number of 179 and a saponification number of 181.

As a further illustration, for example, ordinary wood rosin is subjected to treatment with furfural, or other selective solvent for color bodies, a rosin solution being extracted with the selective solvent, separated therefrom and the treated rosin recovered from the separated rosin solution, all as disclosed in detail in United States Letters Patent No. 1,715,088, referred to above. The rosin product of the treatment with a selective solvent is then distilled under vacuum and about 300 parts of the distillate is dissolved in about 100 parts of 95% ethyl alcohol with the aid of heat. The solution is then cooled and filtered and the filtrate washed with 100 parts of ethyl alcohol. The product will be found to be substantially pure abietic acid, having an acid number of 184 and a saponification number of 186. If desired the order of the treatments with a selective solvent and by distillation may be reversed.

When the crystallized rosin is washed with a solvent in order to remove adhering color bodies, the washings may be combined with the mother liquor from which the rosin was crystallized and additional refined rosin may be crystallized therefrom by distilling off a portion of the solvent and cooling. Obviously, the mother liquor alone may be so treated for the recovery of additional rosin.

In the carrying out of the method embodying my invention, it will be noted that the crystallization step operates to remove residual color bodies from the rosin, the tendency of which to crystallize has been increased by the pretreatment by distillation, or with a selective solvent for color bodies. When the rosin is pretreated by distillation only, the residual color bodies removed will be mainly latent color bodies with some visible color bodies, since distillation is effective primarily for the removal of visible bodies. On the other hand, when the rosin is pretreated with a selective solvent the residual color bodies will be probably largely visible bodies and where both distillation and selective solvent are used for pretreatment the crystallization will result in removal of such residual latent and visible bodies as the rosin contains. In any event, the color bodies remaining in the rosin after pretreatment will be readily easily removed by the crystallization step due to the rendering of the rosin more easily crystallizable than is the original rosin.

It will be understood that crystallization of refined rosin from the solvent may be effected by the addition of water to a solution of rosin therein and that the solution of rosin and solvent from which refined rosin may be crystallized, may be formed without heating.

It will be understood that I do not intend to limit the scope of my invention by the specific illustrations of its practical adaptation given herein by way of example.

What I claim and desire to protect by Letters Patent is:

1. The method of refining wood rosin containing color bodies which includes treating wood rosin to effect removal of color bodies therefrom and then effecting crystallization of pretreated rosin from a neutral, organic, water miscible solvent from which rosin can be crystallized to effect the removal of residual color bodies therefrom.

2. The method of refining wood rosin containing color bodies which includes treating wood rosin to effect removal of color bodies therefrom and to increase its tendency to crystallize and then effecting crystallization of pretreated rosin from a neutral, organic, water miscible solvent from which rosin can be crystallized to effect the removal of residual color bodies therefrom.

3. The method of refining wood rosin containing color bodies which includes treating wood rosin to effect removal of color bodies therefrom and then effecting crystallization of pretreated rosin from an alcohol from which rosin can be crystallized to effect the removal of residual color bodies therefrom.

4. The method of refining wood rosin containing color bodies which includes subjecting wood rosin to distillation, dissolving distilled rosin in a neutral, organic, water miscible solvent therefor from which rosin can be crystallized and effecting crystallization of refined rosin from the solution formed.

5. The method of refining wood rosin containing color bodies which includes subjecting wood rosin to distillation, dissolving distilled rosin in an alcohol from which rosin can be crystallized and effecting crystallization of refined rosin from the solution formed.

6. The method of refining wood rosin containing color bodies which includes subjecting wood rosin successively to treatment by distillation and by extraction with a selective solvent for color bodies in the rosin, dissolving treated rosin in a neutral, organic, water miscible solvent therefor from which rosin can be crystallized and effecting crystallization of refined rosin from the solution formed.

7. The method of refining wood rosin containing color bodies which includes treating wood rosin for the removal of color bodies therefrom and to increase its tendency to crystallize, dissolving an excess of treated rosin in a neutral, organic, water miscible solvent from which rosin can be crystallized with the aid of heat and cooling the solution formed to effect crystallization of refined rosin therefrom.

8. The method of refining wood rosin containing color bodies which includes subjecting wood rosin successively to treatment by distillation and by extraction with furfural, dissolving treated rosin in a neutral, organic, water miscible solvent from which rosin can be crystallized and effecting crystallization of refined rosin from the solution formed.

9. The method of refining wood rosin containing color bodies which includes subjecting wood rosin to distillation under subatmospheric pressure, dissolving distilled rosin in a neutral, organic, water miscible solvent therefor from which rosin can be crystallized, and effecting crystallization of refined rosin from the solution formed.

10. The method of refining wood rosin containing color bodies which includes treating wood rosin to effect the removal of color bodies therefrom, and then effecting crystallization of pretreated rosin from a lower aliphatic alcohol to effect the removal of residual color bodies therefrom.

11. The method of refining wood rosin containing color bodies which includes subjecting wood rosin to distillation, dissolving distilled rosin in a lower aliphatic alcohol, and effecting crystallization of refined rosin from the solution formed.

12. The method of refining wood rosin containing color bodies which includes treating wood rosin to effect the removal of color bodies therefrom, and then effecting crystallization of pretreated rosin from ethyl alcohol to effect the removal of residual color bodies therefrom.

13. The method of refining wood rosin containing color bodies which includes treating wood rosin to effect the removal of color bodies therefrom, and then effecting crystallization of pretreated rosin from acetone to effect the removal of residual color bodies therefrom.

14. The method of refining wood rosin containing color bodies which includes subjecting wood rosin to distillation, dissolving distilled rosin in ethyl alcohol, and effecting crystallization of refined rosin from the solution formed.

15. The method of refining wood rosin containing color bodies which includes subjecting wood rosin to distillation, dissolving distilled rosin in acetone, and effecting crystallization of refined rosin from the solution formed.

16. The method of refining wood rosin containing color bodies which includes treating wood rosin for the removal of color bodies therefrom and to increase its tendency to crystallize, dissolving an excess of treated rosin in ethyl alcohol with the aid of heat, and cooling the solution formed to effect crystallization of refined rosin therefrom.

17. The method of refining wood rosin containing color bodies which includes treating wood rosin for the removal of color bodies therefrom and to increase its tendency to crystallize, dissolving an excess of treated rosin in acetone with the aid of heat, and cooling the solution formed to effect crystallization of refined rosin therefrom.

18. The method of refining wood rosin containing color bodies which includes treating wood rosin to effect the removal of color bodies therefrom and then effecting crystallization of pretreated rosin from a lower aliphatic alcohol containing water to effect the removal of residual color bodies therefrom.

19. The method of refining wood rosin containing color bodies which includes subjecting wood rosin to treatment by extraction with a selective solvent for color bodies in the rosin, dissolving treated rosin in a neutral, organic, water miscible solvent therefor from which rosin can be crystallized, and effecting crystallization of refined rosin from the solution formed.

20. The method of refining wood rosin containing color bodies which includes subjecting wood rosin to treatment by extraction with a selective solvent for color bodies in the rosin, dissolving treated rosin in an alcohol from which rosin can be crystallized, and effecting crystallization of refined rosin from the solution formed.

21. The method of refining wood rosin containing color bodies which includes subjecting wood rosin in solution to treatment by extraction with a selective solvent for color bodies in the rosin, which is substantially immiscible with the rosin solvent, dissolving treated rosin in a neutral, organic, water-miscible solvent therefor from which rosin can be crystallized, and effecting crystallization of refined rosin from the solution formed.

22. The method of refining wood rosin containing color bodies which includes subjecting wood rosin in solution to treatment by extraction with a selective solvent for color bodies in the rosin, which is substantially immiscible with the rosin solvent, dissolving treated rosin in an alcohol from which rosin can be crystallized, and effecting crystallization of refined rosin from the solution formed.

23. The method of refining wood rosin containing color bodies which includes subjecting wood rosin to treatment by extraction with a selective solvent for color bodies in the rosin, dissolving treated rosin in a monohydric alcohol from which rosin can be crystallized, and effecting crystallization of refined rosin from the solution formed.

24. The method of refining wood rosin containing color bodies which includes subjecting wood rosin to treatment by extraction with a selective solvent for color bodies in the rosin, dissolving treated rosin in acetone from which rosin can be crystallized, and effecting crystallization of refined rosin from the solution formed.

25. The method of refining wood rosin containing color bodies which includes subjecting wood rosin in solution to treatment by extraction with furfural, dissolving treated rosin in a neutral, organic, water-miscible solvent therefor from which rosin can be crystallized, and effecting crystallization of refined rosin from the solution formed.

26. The method of refining wood rosin containing color bodies which includes subjecting wood rosin in solution to treatment by extraction with furfural, dissolving treated rosin in a monohydric alcohol from which rosin can be crystallized, and effecting crystallization of refined rosin from the solution formed.

IRVIN W. HUMPHREY.